United States Patent [19]

Matsuura et al.

[11] Patent Number: 4,604,860
[45] Date of Patent: Aug. 12, 1986

[54] METHOD FOR STRANDING PROFILE STRANDS

[75] Inventors: Takayuki Matsuura; Kenji Miyazaki, both of Osaka, Japan

[73] Assignee: Sumitomo Electric Industries, Ltd., Osaka, Japan

[21] Appl. No.: 683,925

[22] Filed: Dec. 20, 1984

[30] Foreign Application Priority Data

Jan. 23, 1984 [JP] Japan .................................. 59-10595

[51] Int. Cl.⁴ .......................... D07B 5/10; D07B 3/00; D07B 7/00
[52] U.S. Cl. ........................................... 57/9; 57/311
[58] Field of Search ................ 57/6, 9, 138, 215, 311, 57/3, 12, 13, 33, 282, 290, 309

[56] References Cited

U.S. PATENT DOCUMENTS 4,009,561 3/1977 Young ................................ 57/9 X
4,530,205 7/1985 Seiler et al. .............................. 57/9

Primary Examiner—Donald Watkins
Attorney, Agent, or Firm—W. G. Fasse; D. H. Kane, Jr.

[57] ABSTRACT

A method of stranding profiled strands comprises the steps of stranding a plurality of profiled strands (7) together around an optical fiber conductor or cable (2) which serves as a central core while imparting twist to each profiled strand by the use of a rigid type stranding machine, and then heat-treating the strands (7) along with the optical fiber conductor or cable (2) so as to remove strains or stress from the heat treated strands.

15 Claims, 7 Drawing Figures

METHOD FOR STRANDING PROFILE STRANDS

BACKGROUND OF THE INVENTION

This invention relates to a method for stranding profile strands. The products obtained by the method of this invention typically include composite aerial wires such as aerial ground wires and aerial transmission wires, but they also include stranded wires such as ropes. In addition, this invention is advantageous particularly when applied to an optical composite aerial ground wire having an optical transmission function.

For example, an aerial ground wire which has been used conventionally is formed of an aluminum covered steel wire and/or aluminum alloy wire of circular cross section, and comprises a single central wire and several, e.g., 6 strands twisted around the central wire. Recently, however, with the spread of optical transmissions, an attempt has been made to make efficient use of an aerial ground wire by providing such a wire with an optical transmission function.

Such aerial ground wire having an optical transmission function uses an optical fiber conductor as the central wire material. There are various types of fiber optical conductors, but most of these conventional optical conductors comprise a pipe of aluminum or its alloy which receives an optical fiber core of one or more optical fibers. Although each optical fiber forms an optical conductor, several such fibers forming a core may still be referred to as an optical conductor. However, the tensile strength of an optical fiber conductor is not so high as that of an ordinary wire. Thus, the use of an optical fiber in a conductor results in a decrease in the strength of the aerial ground wire as a whole. To obtain the strength necessary for an aerial ground wire, one could increase the diameter of strands to be used. If, however, such procedure is simply put to practice, the apparent diameter of the aerial ground wire in its entirety increases and hence the wire is liable to receive an increased wind pressure; thus, from the standpoint of use of an aerial ground wire, the result is not so desirable.

As a method of increasing the cross-sectional area and the strength of each strand while decreasing the outer diameter of the entire aerial ground wire, the following suggestion has been made: the cross-section of strands to be stranded or twisted together to form an optical fiber conductor, should be made substantially a sector so that the outer surface of the aerial ground wire obtained is substantially a cylindrical surface. The sector referred to herein is a shape which is obtained when an area defined between two concentric circles is cut by radially extending lines. If a stranded wire is formed of strands each having such cross-sectional shape, not only is the tensile strength increased without increasing the outer diameter of the stranded wire so much, but also there is obtained a concomitant effect that the ambient pressure on the optical fiber conductor passing through the center is relieved by the bridge effect of the strands forming the stranded wire layer.

However, profile strands having the mentioned sector cross-section encounter some problems during stranding. The conventional stranding methods are roughly classified into two types. One first type stranding is the so-called "untwisted" type. The stranding machines for this first type of stranding include a "planetary type stranding machine", a "tubular type stranding machine" and a "take-up rotary type stranding machine having an untwisting function". The second stranding type is the so-called "non-untwisting" type. The stranding machines for this type of stranding include the "rigid type stranding machine" and the "take-up rotary type stranding machine having no untwisting function".

In the "untwisted" type, e.g., in a planetary type stranding machine, bobbins for supplying strands are caused to perform a planetary motion around the central wire material while maintaining their axes directed in a fixed direction. Therefore, the strands will be spirally wound around the central wire material while their inclined attitudes on the cross-sections of the strands to be stranded together around the central wire material, are maintained constant. If the cross-section of the strands is circular, even the use of this type of stranding makes it possible to arrange the strands regularly around the outer peripheral surface of the central wire material, but in the case of profile strands having a profile cross-section such as a sector, this "untwisted" type cannot be simply used.

In contrast thereto, with the "non-untwisted" type of stranding, said profile strands can be stranded together in a state in which they are in close surface contact with the outer peripheral surface of the central wire material. However, the strands stranded together by this type will have large stresses remaining therein, and unless these stresses are removed, it is impossible to obtain a stranded wire having a satisfactory performance. That is, what is required of a stranded wire is freedom from the "loosening" of the strands, freedom from the rotation (untwisting) of the entire stranded wire, and freedom from the "undulation" of the stranded wire, meaning that the stranded wire should be straight as a whole. However, where stranding is performed by the "non-untwisted" type, the aforesaid requirements for stranded wires cannot be met due to residual stresses in the strands. For this reason, where stranding is performed by the "non-untwisted" type, it has been a usual practice to pass the stranded wire through a post-forming step subsequent to the stranding or twisting step so as to remove the residual stresses in the strands. This post-forming step is performed by post-forming rollers externally pressing the stranded wire.

Even if this post-forming step is performed, this does not necessarily mean that all the problems caused by the "non-untwisted" type can be solved. First, in the case of a stranded wire of high tensile strength, such as is formed of steel strands, the residual stresses cannot be completely removed by a mere post-forming step. Particularly in the case of a stranded wire forming the aforesaid optical fiber conductor and using a central wire material, the optical fibers can be damaged by this post-forming step. That is, the pressure applied by the post-forming step can deform the pipe which forms the outer periphery of the optical fiber conductor, thus crushing the optical fibers in the interior, or the rollers used in the post-forming step produce a tensile force which can break the optical fibers in the interior.

SUMMARY OF THE INVENTION

Accordingly, an object of this invention is to provide a method of stranding profile strands which is capable of removing the strains remaining in the profile strands while performing the "non-untwisted" type of stranding.

The stranding method of this invention comprises the steps of spirally stranding a plurality of profile strands together around a central wire material while imparting twist to each profile strand by the "untwisted" type of stranding, and heat-treating the plurality of profile strands along with the central wire material to remove the strains.

According to the method of this invention, the strains remaining in a plurality of profile strands stranded together around a central wire material can be advantageously removed by heat treatment. Thus, the qualities required of stranded wires, i.e., freedom from "loosening" of the strands, freedom from rotation of the entire stranded wire, and freedom from "undulation" of the stranded wire, can all be satisfied. Since the method of the invention comprises substantially only two steps, stranded wires can be easily and efficiently manufactured.

DESCRIPTION OF THE PREFERRED EMBODIMENTS

Figure 1:
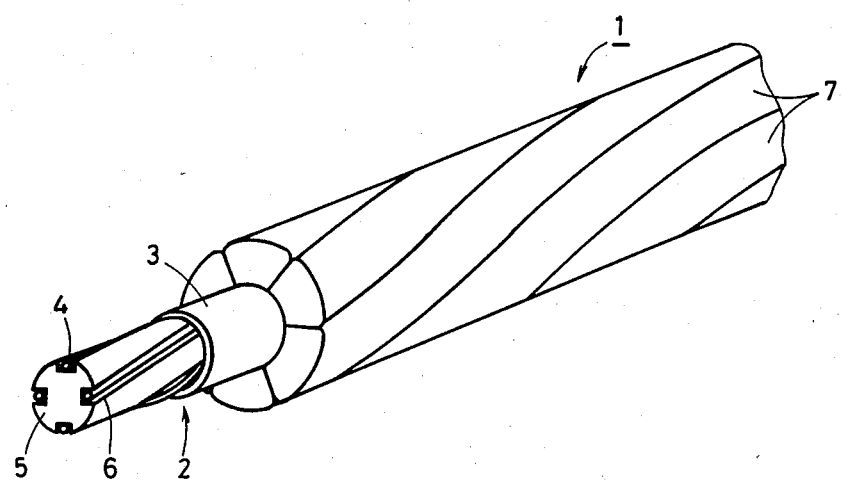
FIG. 1 is a fragmentary perspective view showing an optical composite aerial ground wire 1 as an example of a stranded wire made by the method this invention.

FIG. 1 is a fragmentary perspective view showing an optical composite aerial ground wire or cable 1 made by an embodiment of this invention. The optical composite aerial ground wire 1 comprises an optical fiber conductor 2 including a plurality of individual optical fibers 4 held in grooves 6 of a fiber carrier core 5 surrounded by a circular pipe 3 of aluminum or an aluminum alloy. The grooves 6 in which the optical fibers 4 are received, extend serially in the peripheral surface of the core 5 of, e.g., aluminum. Six profiled strands 7 of substantially sectorial cross-section are stranded together on the outer surface of the pipe 3. The profile strands 7 are formed of steel wires or aluminum-covered steel wires, and when their tensile strength is not less than 60 kg/mm², the significance of this invention becomes remarkable. The profiled strands 7 form a substantially cylindrical stranded wire layer on the outer peripheral surface of the optical fiber cable 2.

Figure 2:
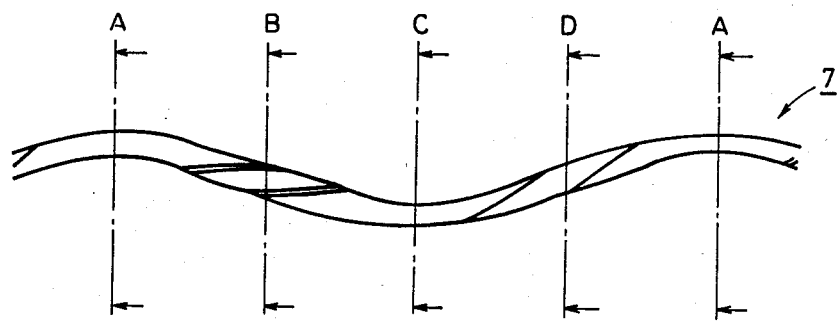
FIG. 2 is a front view singly showing only one of the profile strands used in FIG. 1.

FIG. 2 is a front view showing one of the profiled strands 7 shown in FIG. 1. The profiled strand 7 has been given spiral twist. The cross-sectional shape of this profiled strand 7 taken at different positions is shown collectively in FIG. 3.

Figure 3:
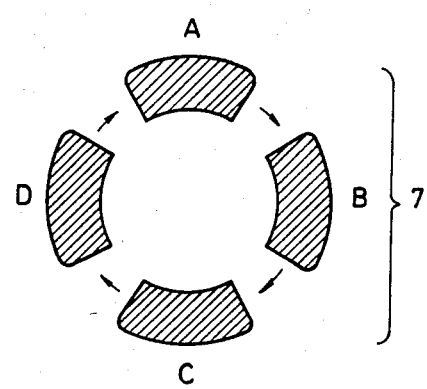
FIG. 3 shows the cross-sections of a profile strand taken at different positions shown in FIG. 2.

In FIG. 3, the sectorial cross-sections shown at A-D correspond to the cross-sections taken along the lines A-D of FIG. 2. As shown by arrows in FIG. 3, the cross-section changes as indicated at A, B, C, D, A and so on. In embodying the method of this invention, first, the profiled strands 7 are stranded together around the pipe 3 of the optical fiber conductor 2 so that the shape shown in FIG. 2 may be obtained. This will now be described with reference to FIG. 4.

Figure 4:
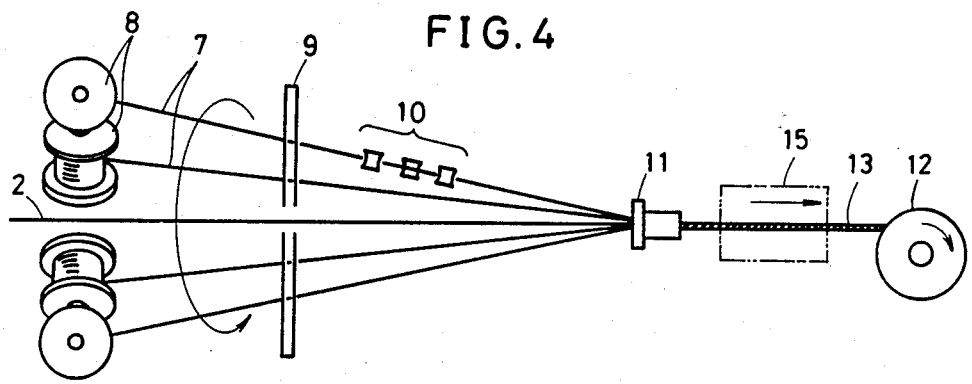
FIG. 4 diagrammatically shows the step of spirally stranding profile strands together around an optical fiber conductor 2 while imparting twist to each profile strand.

FIG. 4 is a view for explaining the step of spirally stranding a plurality of profiled strands 7 together around an optical fiber conductor 2 or around its pipe 3 serving as a central wire material while imparting twist to each profiled strand. FIG. 4 shows a conventional rigid type stranding machine for carrying out the so-called "non-untwisted" type of stranding. Each of the bobbins 8 on the supply side has a profiled strand 7 wound thereon in the usual manner. Such bobbins 8 are prepared, for example, six in number, two bobbins on the front side being omitted from the illustration, and are mounted for performing an orbital rotation around the central axis of the optical fiber conductor 2. Each bobbin 8 makes one revolution around its own axis while making one orbital revolution, as in the case of the relative motion between the earth and the moon. This is a feature of the "non-untwisted" type of stranding. The strands 7 drawn out of the bobbins 8 are first passed through an eyeplate 9 and through between preforming rollers 10. Then the preformed strands 7 are collected at the position of a collector die 11. The bobbins 8, eyeplate 9 and preforming rollers 10 are synchronously rotated around the central axis of the optical fiber unit 2. Therefore, at the position of the collector die 11, the profiled strands 7 are spirally stranded together around the pipe 3 of the optical fiber conductor 2 while twist is imparted to each profiled strand 7. Thereafter, the stranded wire is wound on a bobbin 12 on the take-up side. The strand pitch of the stranded wire 13 to be wound on the bobbin 12 can be optionally selected by adjusting the length of the stranded wire 13 to be wound on the bobbin 12 on the take-up side per unit of time, and the number of revolutions around the central axis of the optical fiber conductor 2 per unit of time.

In addition, in FIG. 4 a rigid type stranding machine is used, by way of example. However, since the movements of the components included in the aforesaid motion system are relative, the rigid type stranding machine may be replaced by a "take-up rotary type stranding machine having no untwisting function". In this case, in FIG. 4, the bobbins 8 will remain stationary rather than making orbital rotation around the central axis of the optical fiber conductor 2, and instead the supply bobbin of the optical fiber conductor 2, collector die 11 and bobbin 12 on the take-up side will rotate around said central axis.

Figure 5:
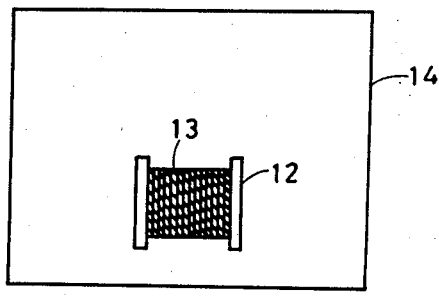
FIG. 5 diagrammatically shows a heat-treating step for removal of the strains in the profile strands.

As shown in FIG. 5, the bobbin 12 having the stranded wire 13 wound thereon is then heat-treated in, e.g., a batch furnace 14. This heat treatment is performed to remove the residual stresses in the twisted profiled strands 7 and has only to be effective in at least removing the strains in the material of the profiled strands 7. If, however, this heat treatment condition is too severe, an excessive annealing effect would be produced on the material of the profiled strands 7, decreasing the strength to a great extent. Further, there is the danger of the optical fiber conductor 2 being adversely affected. Hence, preferable heat treatment conditions for profiled strands 7 made of steel wires or of aluminum coverted steel wires, involve a temperature within the range of 200°–500° C. and a treatment duration of about 30 minutes. If the temperature is less than 200° C., the strains in the profiled strands 7 could not be removed, while, reversely, if it exceeds 500° C., the strength of the profiled strands 7 would be decreased.

As for the heat-treating method, besides using the batch furnace 14 shown in FIG. 5, a heat-treating device 15 may be placed at a position shown in phantom lines in FIG. 4 so as to effect the heat treatment in the so-called in-line manner. The heat-treating furnace 15 used herein may be a high frequency induction heating device or a tunnel furnace. In addition, in the batch type shown in FIG. 5, a high frequency induction heating device may be used. Further, the Joule heat may be used as heating means by passing a currently directly through the profiled strands 7.

Figure 6:
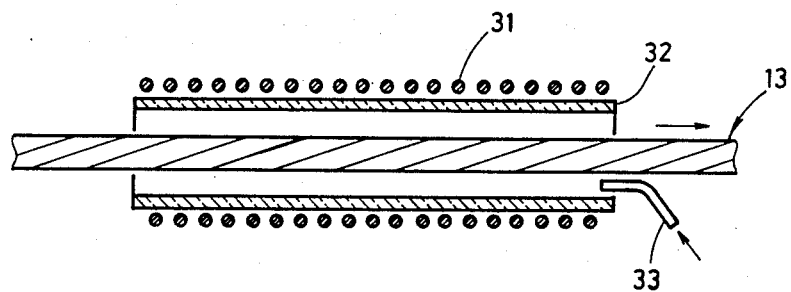
FIG. 6 diagrammatically shows another example of a heat-treating step for removal of the strains in the profile strands.
Figure 7:
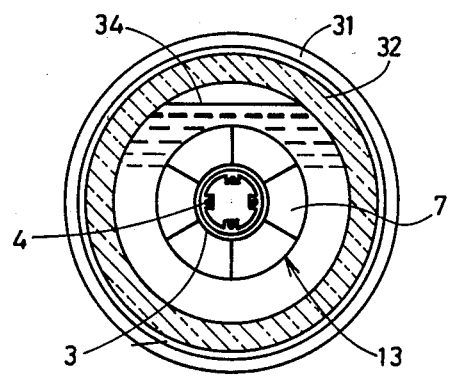
FIG. 7 is an enlarged sectional view through FIG. 6 with the section extending about perpendicularly to the longitudinal axis.

In the in-line heat treatment described above, in the case of using high frequency induction heating, as shown in FIGS. 6 and 7, a ceramic pipe 32 is surrounded by an induction coil 31 and a stranded wire 13 is passed through said ceramic pipe 32. By introducing water into the ceramic pipe 32 through a water conduit 33, the stranded wire 13 can be cooled by water 34. Although the efficiency of heating the stranded wire 13 is lowered, the cooling makes it possible to reduce the tendency of the heat produced in the steel portion of the stranded wire 13 to be transmitted to the optical fiber core 4. Therefore, there is also obtained a merit that degradation of the quality of the optical fiber unit 4 due to an increase in temperature can be prevented.

When the strains in the profiled strands 7 are removed in this manner, an optical composite aerial ground wire 1 as shown in FIG. 1 is obtained.

So far, the invention has been described in detail on the basis of embodiments thereof illustrated with respect to the case of obtaining optical composite aerial ground wires, but the invention is likewise applicable to transmission lines and to ropes.

In the illustrated embodiments, the cross-sectional shape of profiled strands 7 has been shown as a sector, but the invention is not limited thereto and can be advantageously applied provided that the strands are other than circular in cross-section.

Although the present invention has been described and illustrated in detail, it is clearly understood that the same is by way of illustration and example only and is not to be taken by way of limitation, the scope of the present invention being limited only by the terms of the appended claims.

What is claimed is:

1. A method of stranding profiled strands for forming a cable, comprising the steps of first spirally stranding a plurality of profiled strands (7) together around a central core means while imparting twist to each profiled strand to form said cable and then heat-treating said plurality of profiled strands (7) in said cable together with said core means, said heat-treating step taking place in a temperature range and for a time duration sufficient for removing stress from said profiled strands.

2. The method of claim 1, comprising providing a heater downstream of stranding tool means as viewed in a cable feed advance direction, for performing said heating step after said step of stranding has been carried out by said stranding tools.

3. The method of claim 1, comprising using steel wires as said profiled strands (7), said steel wires having a tensile strength of at least 60 kg/mm$^2$.

4. The method of claim 3, wherein said heat-treating is carried out within a temperature range of 200°–500° C.

5. The method of claim 1, further comprising providing said central core means in the form of an optical fiber conductor means.

6. The method of claim 1, further comprising using strands having a cross-sectional shape which is substantially sectorial.

7. The method of claim 1, further comprising winding said cable onto a bobbin and placing said bobbin (12) having wound thereon said cable with the plurality of profiled strands (7) into a heating chamber for performing said heat-treating step.

8. The method of claim 1, wherein said heat-treating step is carried out before said cable is wound onto a bobbin (12), but subsequent to said stranding.

9. The method of claim 8, wherein said heat-treating step is carried out by passing said cable through a heating chamber on the way from the wire stranding step to the step of winding the cable on the bobbin.

10. The method of claim 9, comprising using as said heating chamber a high frequency induction heating device, and further performing a simultaneous cooling step by cooling the cable directly with water.

11. The method of claim 3, further comprising coating said steel wires with an aluminum cover prior to said stranding step.

12. The method of claim 1, further comprising providing said cable with an aluminum pipe forming a cable core, and then stranding said profiled strands onto said aluminum pipe.

13. A method of stranding profiled strands for forming a cable, comprising the steps of providing steel wire strands having a substantially sectorial cross-sectional shape, spirally stranding a plurality of said sectorial steel wire strands together around a central core of an optical fiber conductor means, while imparting twist to each sectorial steel wire strand to form said cable, heat-treating said plurality of sectorial steel wire strands in said cable together with said central core for removing stress from said sectorial steel wire strands, wherein said heat treating step is performed by passing said cable through an elongated pipe (32) surrounded by an induction heating device and simultaneously passing cooling water through said elongated pipe (32), and then winding said cable after said heat-treating step onto a bobbin (12).

14. The method of claim 13, further comprising providing said sectorial steel wire strands with an aluminum cover.

15. The method of claim 13, further comprising providing said central core of said optical fiber conductor means with an aluminum pipe forming a shell for optical conductor fibers and simultaneously said central core for said cable.

* * * * *